April 22, 1952 J. FICHTER 2,594,143
ADJUSTABLE RING AND THREAD GAUGE
Filed Aug. 23, 1947

INVENTOR
Julius Fichter
BY
Woodling and Krost
attys

Patented Apr. 22, 1952

2,594,143

UNITED STATES PATENT OFFICE 2,594,143

ADJUSTABLE RING AND THREAD GAUGE

Julius Fichter, South Euclid, Ohio

Application August 23, 1947, Serial No. 770,283

5 Claims. (Cl. 33—178)

My invention relates to gauges for outside dimensions, and more particularly to ring gauges and gauges used to gauge the geometric proportions of round and threaded work.

An object of my invention is to provide a thread gauge adjustable to a wide range of diameters for a given pitch thread.

Another object of my invention is to provide an improved gauge of such structure as to meet all conditions of usage and to retain its accuracy.

Another object of my invention is to provide an improved gauge having interchangeable and replaceable sets of gauging elements of simple and durable structure.

Another object of my invention is to provide improved replaceable gauging elements that can be manufactured with a saving of time, material and labor.

Another object of my invention is to provide an improved gauge of such structure as to be adjustable to suit the proper conditions, and such adjustments to be made requiring the minimum amount of skill.

A further object of my invention is to provide an improved gauge having gauging elements alignable relative to one another to compensate for gauge body warpage and to provide special effects.

A still further object of my invention is to provide a gauge having relatively large contact surfaces, but having a relatively small and lightweight gauge body.

A still further object of my invention is to provide a gauge of relatively low manufacturing and maintenance cost for extremely small diameter workpieces, the gauge having a plurality of Carboloy cemented carbide contact surfaces which are cheaply and easily manufactured, and the gauge being adapted to accurately align the plurality of pieces to cooperate as a continuous thread gauge, or a perfect outside dimension gauge.

Other objects and a fuller understanding of my invention may be had by referring to the following description and claims, taken in conjunction with the accompanying drawing, in which:

Figures 1, 2:
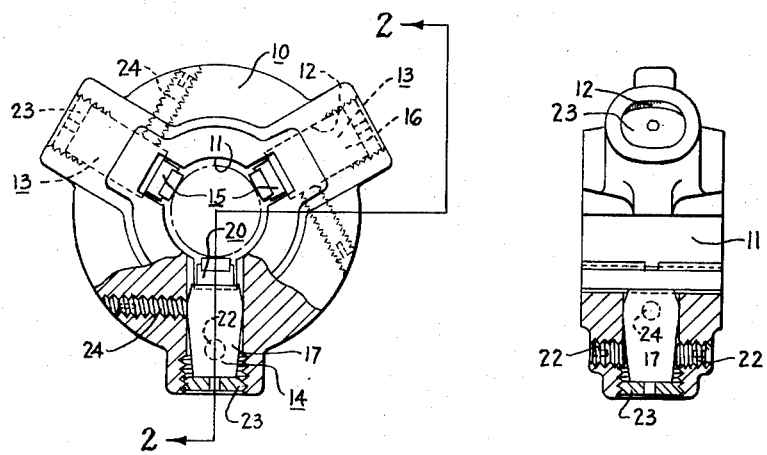
Figure 1 is a side elevational view of my improved gauge having a section broken away to illustrate the gauging elements and the adjustable and retaining means.
Figure 2 is a partial sectional elevational view of Figure 1, taken on the line 2—2 of Figure 1.
Figures 3, 4:
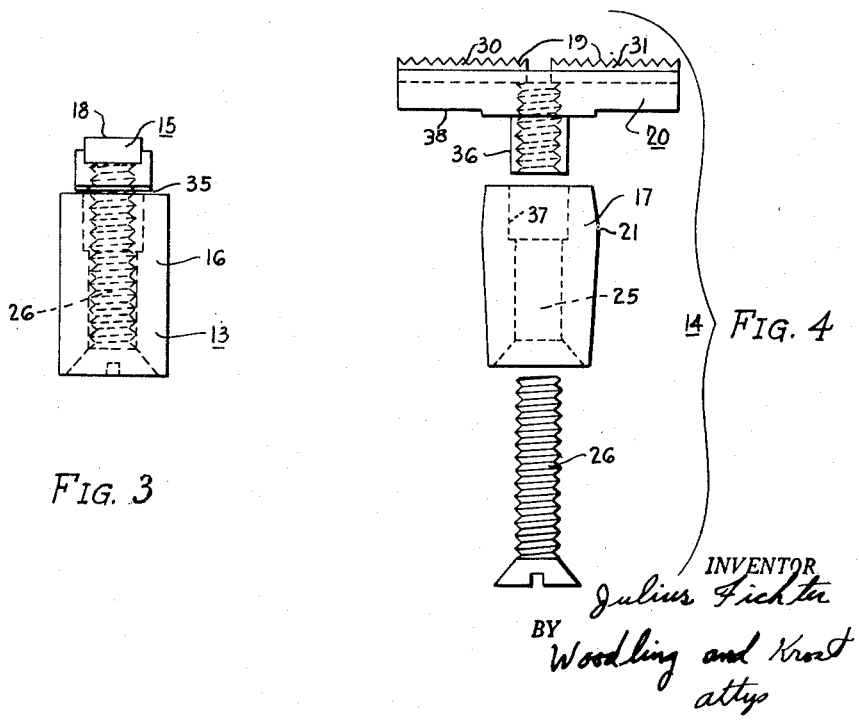

Figure 3 is a detailed enlarged scale elevational view of one of the gauging elements of Figure 1 having a straight wall shank portion, and viewed from the end of the removable end portion; and Figure 4 is an exploded enlarged scale view of a gauging element having a tapered wall shank portion, and having the gauging contact surface provided with segments of a continuous thread; the gauge element being viewed from the side of the removable end portion.

With reference to the Figures 1 and 2 of the drawing, my gauge comprises a body 10 having an opening 11 to receive the work or the threaded piece which is to be gauged. A plurality of holes 12 extend from the opening 11 radially to the outer surface of the body 10. The longitudinal axes of the holes 12 all lie substantially on a common plane; that is, the longitudinal axes of the holes 12 define a common plane as nearly as is possible to do by ordinary production means. Two gauging elements 13 are mounted in two of the holes 12, and a tiltable gauge element 14 is located in the remaining hole 12.

Each of the gauging elements 13 has an end portion 15, and the gauging element 14 has an end portion 20. The gauging elements 13 are provided with a straight wall shank portion 16, whereas the tiltable gauging element 14 provided with a shank portion 17 having a tapered wall surface as illustrated in the Figures 1, 2 and 4. The end portions 15 may have flat contact surfaces 18, as illustrated in Figures 1, 2 and 3, or they may be provided with segments of a continuous thread as indicated on end portion 20 by reference character 19 in Figure 4.

The body 10 is preferably made of a solid section surrounding the opening 11 to retain its shape and thereby retain the gauging elements 13 and 14 in a fixed relative position at all times, but it is to be understood that my invention is not limited to this annular disc body 10 since any other form which holds the gauging element to receive the work or threaded piece to be tested may be employed. Nevertheless, the body 10 should be ribbed and reinforced in order to retain its form regardless of rough handling and uneven temperature changes. In actual practice, however, it has been found that the gauging contact surfaces 18 or 19 must be within a fraction of a thousandth of an inch for some types of close gauging work, and that the body 10 in spite of all manufacturing precautions will warp and the holes 12 will become misaligned after a period of time and usage. Furthermore, if the manufacturing tolerances in producing the holes 12 are held to extremely close limits in order to assure the longitudinal axes of the holes 12 and the shank portions 16 and 17 being in one common plane, the cost of manufacture would be extremely high.

Furthermore, I have found that it is desirable to provide a contact gauging surface of as large a size as practical to contact the workpiece. Therefore, as illustrated best in the Figures 2 and 4 of the drawing, it will be seen that my gauge employs a contact surface of relatively large proportions in the direction of contact with the workpiece. I refer to the direction of contact of the end portion as the width. In the Figure 2 it will be seen that the work contacting surface extends completely the whole width of the gauge. In the Figure 4, it will be seen that a considerable number of thread portions are cut in the contact surface 19. Such a long contact surface, of course, affords even greater opportunity for misalignment relative to one another, but if properly aligned provides a much more accurate gauging device.

The shank portion 17 is illustrated as being tapered, but if so desired it may be made in steps and thereby accomplish substantially the same result. In the Figure 4, the reference character 21 indicates a portion of the shank 17 having a cross-sectional form substantially complementary to the cross-sectional form of one of the holes 12. That is, the holes 12 are preferably cylindrical in form with straight side walls. Therefore, a cross-section through the shank portion 17 at the point indicated by the reference character 21 would be a circle of substantially the same dimensions as the internal dimension of the hole 12. The shank 17, in the preferred embodiment illustrated, tapers from the point 21 both forwardly and rearwardly to a cross-sectional form smaller than that at the point 21. Therefore, the shank portion 17 will be tiltable in the hole 12 and thereby will be adapted to move the end portion 20 thereof relative to the end portions 15 of the other gauging elements. In Figure 2 of the drawing, are best illustrated two adjustment screw members 22. The screw members 22 are threadedly engaged in the body 10 as illustrated, and are adapted to contact the portion of the shank 17 rearwardly of the point 21. Thus, by turning one of the screw members 22 in a right hand direction, and turning the other screw member 22 in a left hand direction, the shank 17 may be tilted in the hole 12 and thereby adjust the relative position of the contact surface on the end portion 20 relative to the end portions 15 of the other gauge elements.

In each of the holes 12, I have provided adjustment plugs 23 to longitudinally position the shank portions 16 and 17. Thus, the threaded adjustment plugs 23 may be turned to apply pressure to the shank 16 or 17 and move the entire gauge element inwardly relative to the opening 11. The diameter adjustment is normally accomplished by placing a master gauge through the opening 11, and moving the gauging elements 13 and 14 inwardly toward the master gauge by threadedly turning the adjustment plugs 23. I have provided a locking screw 24 for each hole 12, the screw 24 being threadedly engaged in the body 10, and adapted to contact the side of the shanks 16 and 17. After the gauging elements have contacted the master gauge properly, they are then held in the selected position by tightening the lock screws 24. Thereafter, the relative position of the contact surfaces are adjusted by my improved adjustment provision. That is, with the master gauge in the opening 11, the tiltable shank 17 of the gauging element 14 is tilted by means of the adjustment screws 22 until all portions of the end portion 20 fit snugly, but do not bind, against the master gauge. It is not necessary to adjust all of the gauging elements, but when using a three-element gauge as illustrated in the drawings, one of the gauging elements, namely the tiltable element 14, may be adjusted relative to the other two gauging elements 13 and thereby produce perfect alignment. Thereafter, if an accident or age-warping should pull the gauging elements 13 and 14 out of perfect alignment, the tiltable shank 17 may be further adjusted to bring all of the elements back into perfect alignment.

It is understood, however, that although three gauging elements are illustrated in the drawing, any convenient number of gauging elements may be employed. For example, for testing large diameters of workpieces, it may be an advantage to use a plurality of gauging elements 13 and a plurality of tiltable gauging elements 14, to check not only for roundness but for irregularity or waves in the circumference which may result from the machining of large diameters. Furthermore, when gauges are made for other than round workpieces, two or more gauging elements 13 and two or more tiltable gauging elements 14 may be employed. It will readily be understood, that when a greater number than three gauging elements are employed, more than one adjustable gauging element 14 will be required. The number of adjustable members 14 will depend upon the total number of gauging elements.

Long contact surfaces 18 and 19 are desirable when very close tolerance work is being gauged. Furthermore, a workman using a gauge of this type must handle the gauge all day long, and therefore, the gauge should be as light as is practicable to make it in order that the workman will not suffer from undue fatigue and allow workpieces which are actually not correct to be passed as good pieces. A distinct problem arises, therefore, when a small diameter gauge is to be provided with changeable gauging elements. In the past, gauges having removable gauging elements have provided gauging elements small enough to pass through the alignment holes. However, such small gauging heads as will pass through the alignment hole will not provide the extreme accuracy which I desire to provide in the gauging device. On the other hand, a gauge body 10 large enough to pass a large contact surface through the hole 12, would be extremely bulky and heavy. I have solved the problem of providing large contact surfaces and a small gauge body by the provision of a detachable end portion of long contact surface, and a shank portion to fit in the opening 12. Therefore, the gauging portion may be removed from the shank portion and withdrawn through the opening 11, whereas the shank portion may be withdrawn through the hole 12. In the Figures 3 and 4 of the drawing, my improved gauge element construction is best illustrated. In the Figure 4, for example, I illustrate the shank portion 17 having a longitudinal bore 25 therethrough. A securing screw 26 is adapted to extend through the bore 25 and threadedly engage the end portion 20. This gauging element 14, although illustrated with a tapered shank 17 and threaded gauging surface 19, is in basic principle exactly like the gauging element 13 illustrated in the Figure 3. That is, the gauging elements each comprise the shank portion, a removable end portion, and a securing means extending through the bore of the shank portion to engage the end portion and hold the end portion tightly in contact with the shank portion. The provision of a smooth surface or thread surface is, of course, optional. These members are inserted in my gauge body 10 by placing the shank portion into the hole 12 from the outside surface of the body 10. The removable end portion is dropped into place from the opening 11, and thereafter the screw 26 is extended through the shank 17 and rotated to engage the end portion. The gauging elements are then in place to be adjusted for radial diameter, and the tiltable element 14 to be tilted for alignment. By this arrangement, it will be seen that the opening 11 can be quite small, and yet the dimension of the removable end portion in the direction of contact may be quite large, and yet the body 10 need not be unduly heavy and cumbersome.

In order to prevent any possibility of distortion of the contact surfaces I have provided a stem 36 on the removable end portions 15 and 20, which is adapted to extend into an enlarged portion 37 of the bore 25. The stem 36 is slightly longer than the enlarged portion 37, and therefore the bottom surface 38 of the end portions is spaced from the surface of the shanks, as indicated by the reference character 35 in Figure 3, and prevents any bending stress as a result of tightening the screw 26.

Although I prefer to taper the shank portion 17 in two directions away from the largest cross-sectional dimension at the point 21, as before stated, it may be entirely possible to provide a stepped arrangement for the shank portion 17. Furthermore, I have found that it is possible to provide a tapered opening 12 and thereby use a straight wall shank portion 19 to good advantage. Thus, although the wall of the shank 15 will actually be cylindrical, the rearward portion of the straight wall shank would be smaller than the corresponding portion of the opening.

Carboloy cemented carbide is a material well known to engineers as having extreme hardness, but relatively low tensile strength. Carboloy cemented carbide ring gauges have been provided for some time, but a separate ring gauge must be provided for each size workpiece, and for each thread pitch. Furthermore, Carboloy is extremely hard to thread with ordinary tools, and is usually ground to provide gauging threads. Therefore, it is substantially impossible to provide ordinary Carboloy ring gauges of extremely small sizes.

In my improved gauge device, I have provided cemented carbide contact surfaces by attaching two small cemented carbide blocks 30 and 31 to the surface of the removable end portions 15 and 20. Thus, the cemented carbide surfaces may be ground by ordinary methods and then inserted into my improved gauge and held close together to provide the small diameter so difficult to obtain in the ring gauges known and used in the past. Furthermore, by the provision of such small pieces of cemented carbide, the use of this expensive material is limited to a very small amount.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A gauge for testing the trueness of a workpiece, comprising a body having an opening therethrough to receive said workpiece, said body having spaced holes extending from said opening to the outer surface of said gauge, a plurality of gauge elements, one for each hole, each said element comprising a shank portion and an end portion with a contact surface thereon, said end portion projecting from its respective hole into said opening, the shank portion of at least one gauge element having a first portion of a cross-sectional form substantially complementary to the cross-sectional form of said hole, and having a second portion of cross-sectional form smaller than said hole, and adjustment means to contact said small second portion and tilt said shank in said hole about said complementary first portion as a pivot to align the gauge element relative to the other gauge elements of the gauge.

2. A gauge for testing the trueness of a workpiece, comprising a body having an opening therethrough to receive said workpiece, said body having spaced holes with longitudinal axes thereof extending radially from said opening to the outer surface of said gauge, said longitudinal axes of the holes lying substantially on a common plane, a plurality of gauge elements, one for each of said holes, each said element comprising a shank portion and a removable end portion, said end portion having a contact surface of greater area than the cross-sectional area of said holes, said shank portion having a bore extending longitudinally therethrough, securing means extending through said bore and removably securing said removable end portion to said shank portion, said removable end portion projecting from its respective hole into said opening, the shank portion of at least one gauge element having a first portion of a cross-sectional form substantially complementary to the cross-sectional form of said hole, and tapering from the said first portion to a second portion having a cross-sectional form smaller than the hole, and adjustment means to contact said small second portion and tilt said shank in said hole about said complementary one portion as a pivot to align the gauge element relative to other gauge elements of the gauge.

3. A gauge for testing the trueness of a workpiece, comprising a body having an opening therethrough to receive said workpiece, said body having spaced holes with longitudinal axes thereof extending radially from said opening to the outer surface of said gauge, said longitudinal axes of the holes lying substantially on a common plane, a plurality of gauge elements, one for each of said holes, each said element comprising a shank portion and a removable end portion, said end portion having a contact surface of greater area than the cross-sectional area of said holes, said shank portion having a bore extending longitudinally therethrough, securing means extending through said bore and removably securing said removable end portion to said shank portion, said removable end portion projecting from its respective hole into said opening, the shank portion of at least one gauge element having a first portion of a cross-sectional form substantially complementary to the cross-sectional form of said hole, and tapering from the said first portion to a second portion having a cross-sectional form smaller than the hole, and adjustment means to contact said small second portion and tilt said shank in said hole about said complementary one portion as a pivot to align the gauge element relative to other gauge elements of the gauge, threaded plug means in said holes disposed to abut against said element for adjusting same, and lock means for each of said gauge elements to secure same in said holes.

4. A gauge for simultaneously testing the correctness of thread and trueness of circumference of a circular threaded piece, comprising a body having an opening therethrough to receive said workpiece, said body having spaced holes with longitudinal axes thereof extending radially from said opening to the outer surface of said gauge, said longitudinal axes of the holes lying substantially on a common plane, a plurality of gauge elements, one for each of said holes, each said element comprising a shank portion and a removable end portion, said end portion having testing threads thereon, said testing threads on each of the three elements being related with respect to the threads of the other elements to define portions of a continuous thread, the direction of thread pitch extending across the width of the removable end portion, said end portion width being greater than the said shank portion, said shank portion having a bore extending longitudinally therethrough, securing means extending through said bore and removably securing said removable end portion to said shank portion, said removable end portion projecting from its respective hole into said opening, the shank portion of at least one gauge element having a first portion of a cross-sectional form substantially complementary to the cross-sectional form of said hole, and tapering from the said first portion to a second portion having a cross-sectional form smaller than the hole, and adjustment means to contact said small second portion and tilt said shank in said hole about said complementary one portion as a pivot to align the gauge element relative to other gauge elements of the gauge, and thereby align the threads of the several elements to define a continuous thread.

5. A gauge for testing the trueness of a workpiece, comprising a gauge body member defining a gauging space to receive said workpiece, a plurality of gauge chambers carried by said gauge body member positioned around said gauging space, each gauge chamber comprising a radial opening having an entrance communicating with said gauging space, a plurality of gauge elements, one for each chamber, each said gauge element comprising a shank portion and an end portion with a contact surface thereon, said end portion projecting from its respective chamber into said gauging space, the shank portion of at least one gauge element having a first portion of a cross-sectional form substantially complementary to the cross-sectional form of said chamber, and having a second portion of cross-sectional form smaller than said chamber, and adjustment means to contact said smaller second portion and tilt said shank in said chamber about said complementary first portion as a pivot to align the gauge element relative to the other gauge elements of the gauge.

JULIUS FICHTER.

REFERENCES CITED

The following references are of record in the file of this patent:

UNITED STATES PATENTS

| Number | Name | Date |
|---|---|---|
| 1,092,827 | Dubail | Apr. 14, 1914 |
| 1,354,587 | Taylor et al. | Oct. 5, 1920 |
| 1,499,729 | Hanson | July 1, 1924 |
| 1,610,909 | Wetmore | Dec. 14, 1926 |
| 1,613,824 | Hanson | Jan. 11, 1927 |
| 1,630,690 | Bosle et al. | May 31, 1927 |
| 1,887,372 | Emmons | Nov. 8, 1932 |
| 2,132,407 | Fowler | Oct. 11, 1938 |
| 2,356,133 | Van den Kieboom | Aug. 22, 1944 |
| 2,363,077 | Moore | Nov. 21, 1944 |
| 2,419,263 | Hohwart | Apr. 22, 1947 |

FOREIGN PATENTS

| Number | Country | Date |
|---|---|---|
| 647,674 | Germany | July 9, 1937 |
| 886,731 | France | Oct. 22, 1943 |